Patented Aug. 7, 1951

2,563,772

UNITED STATES PATENT OFFICE 2,563,772

HIGH MOLECULAR WEIGHT HALOGEN-CONTAINING ORGANIC MATERIALS STABILIZED WITH IRON SALTS

Harry A. Cheney, Berkeley, Calif., assignor to Shell Development Company, San Francisco, Calif., a corporation of Delaware No Drawing. Application March 22, 1949,
Serial No. 82,918

17 Claims. (Cl. 260—45.75)

This invention relates to the stabilization of high molecular weight halogen-containing organic materials. More particularly, the invention relates to a novel process for stabilizing high molecular weight halogen-containing organic materials against discoloration caused by the action of heat and/or light and to the heat and light stable compositions produced thereby.

Specifically, the invention provides an efficient and highly economical process for stabilizing high molecular weight halogen-containing organic materials against the effects of heat and light which comprises incorporating with the said materials minor quantities of an iron salt. The invention further provides heat and light stable compositions of matter comprising the high molecular weight halogen-containing organic materials and the iron salts in the minor quantities described hereinbelow.

High molecular weight halogen-containing organic materials are becoming increasingly important in industry. The halogen-containing polymers, for example, find application in the production of coating compositions, fibers, films, and in the production of shaped articles by various molding techniques. The industrial use of these materials is considerably limited, however, by their tendency to decompose, particularly in the presence of heat and/or light, to liberate acid decomposition products. As a result of this decomposition the products become discolored and, in many instances, lose many of their more desirable physical properties. In addition, the acid products formed during the decomposition have a deleterious effect on the metal parts of the fabrication equipment and any metal parts that might be embedded in the finished article.

The decomposition problem is particularly serious in the case of the halogen-containing polymers, such as polyvinyl chloride, which are usually required to be milled and molded at relatively high temperatures, e. g. temperatures in the vicinity of 200° C. When heated at these temperatures the polymer frequently develops strong yellow or brown colors and lose a great part of their strength and toughness.

It has been proposed to stabilize the high molecular weight organic materials against this type of decomposition by the addition thereto of various inorganic or organic compounds, but the results obtained heretofore have not been entirely satisfactory. The inorganic compounds suggested as stabilizers are usually unsatisfactory as they are active for only a very short period and/or are required in such large amounts that the resulting composition loses many of its most desirable properties. The organic stabilizers are generally unsatisfactory as they are rather expensive and are easily lost from the composition through evaporation.

It is an object of the invention, therefore, to provide a method for stabilizing high molecular weight halogen-containing organic materials against the effects of heat and/or light. It is a further object to provide a method for stabilizing the above-described organic materials against the effect of heat and/or light which is highly efficient and can be accomplished at a very low cost. It is a further object to provide a method for stabilizing the above-described organic materials against the effects of heat and/or light which effects little or no change in the other physical properties of the resulting composition. It is a further object to provide compositions comprising the above-described organic materials which are stabilized against the effects of heat and/or light. It is a further object of the invention to provide heat and light stable compositions comprising the above-described organic materials which possess substantially the same electrical properties, transparency, etc. of the unstabilized materials. It is a further object to provide compositions comprising the above-described organic materials which may be subjected to relatively high temperatures for long periods of time without undergoing substantial discoloration or loss of mechanical properties. Other objects and advantages of the invention will be apparent from the following detailed description thereof.

It has now been discovered that these and other objects may be accomplished by incorporating with the high molecular weight halogen-containing organic materials an iron salt in minor quantities, i. e. in amounts sufficient to furnish from 1 part to 95 parts of iron per million parts of organic material.

The discovery that the iron salts could be used as stabilizers was indeed surprising for it had been previously found that iron salts, even in amounts as low as 0.01%, had a pronounced accelerating effect on the decomposition of this type of material when exposed to light and heat. U. S. Patent 2,435,769, issued February 10, 1948, U. S. Patent 2,438,102, issued March 16, 1945, and British Patent 517,597, issued August 31, 1945, for example, clearly disclose that iron salts should be avoided as they enhance the thermal decomposition of high molecular weight halogen-containing materials.

The material to be stabilized by the process of the invention may be any high molecular weight halogen-containing organic material which tends to undergo decomposition when exposed to heat and light. Illustrative examples of such materials are the halogenated fats, halogenated train oils, halogenated waxes, halogenated rubbers, polymers of halogenated monomers, after-halogenated polymers of various monomeric materials, and the like.

The preferred group of high molecular weight organic materials to be stabilized by the process of the invention are the halogen-containing polymers. This includes the polymers obtained from the halogen-containing monomers and the products obtained by halogenating preformed polymers. Examples of this preferred group are the polymers, copolymers and interpolymers of the halogenated dienes, such as 2-chloro-butadiene-1,3, 3-bromo-butadiene-1,3, 2-chloro-3-methylpentadiene-1,4, the halogenated monoolefins, such as vinyl chloride, vinylidene chloride, tetrafluoroethylene, chlorofluoroethylene, methyl chloroacrylate, vinyl chloroacetate, bromostyrene, chloroacrylonitrile, diallyl chlorophthalate, dichlorallyl chloroterphthalate, copolymers and interpolymers of the above-described halogen-containing monomers with other polymerizable organic compounds, such as vinyl acetate, methyl methacrylate, methacrylonitrile, acrylonitrile, styrene, ethylene, butadiene, diallyl phthalate, allyl alcohol, vinyl propionate, and diallyl ether, the after-halogenated products of the above-described polymers, copolymers and interpolymers, such as after-chlorinated polyvinyl chloride, after-chlorinated polyvinylidene chloride, after-brominated polyvinyl chloride, after-chlorinated polymer of 2-chloro-butadiene-1,3, after-brominated polytetrafluoroethylene, after-chlorinated copolymer of chloroacrylonitrile and vinyl acetate, after-chlorinated interpolymer of vinyl chloride, vinyl acetate and methacrylonitrile, after-chlorinated polymethacrylonitrile and the like.

A particularly preferred group of high molecular weight organic material to be stabilized by the process of the invention are the polymers of the chlorine-containing ethenoid monomers. The expression "ethenoid monomers" as used throughout the specification and claims refers to monomers containing at least one >C=C< group in their molecule. Examples of this preferred group are polyvinyl chloride, polyvinylidene chloride, copolymers of vinyl chloride and vinyl acetate, copolymers of chloroallyl aceate and methyl methacrylate, polyallyl chloride, polydiallyl phthalate, polymethallyl chloride, interpolymers of vinyl acetate, vinyl chloride and methyl methacrylate, polytetrachloroethylene, copolymers of polytetrachloroethylene and vinyl propionate, and the like.

The materials to be employed as stabilizers in the process of the invention may be any of the iron salts, such as ferric chloride, ferrous chloride, ferric acetate, ferric arsenate, ferric formate, ferrous formate, ferric hydrophosphite, ferric sulfate, ferric oxalate, ferric tartarate, ferrous acetate, ferrous carbonate, ferrous ammonium sulfate, ferrous iodide, ferrous lactate, ferrous thiosulfate, ferrous tartarate, and the like. Mixtures of the iron salts may be utilized if desired.

The preferred iron salts to be employed are the iron salts of the stable acids, such as ferric chloride, ferrous chloride, ferric sulfate, ferrous sulfate, ferric acetate, ferrous acetate, ferric tartarate, ferrous tartarate, and ferrous oxalate.

The above-described iron salts are to be added to the halogen-containing organic materials in only specific minor quantities, i. e. in an amount sufficient to furnish from 1 part to 95 parts of iron per million parts of material being stabilized. Amounts of iron salts above or below this specific range of proportions either have no stabilization effect or act quite to the contrary and accelerate the decomposition of the material when exposed to light and heat. The preferred amounts of iron to be added to the organic material vary from 3 parts to 60 parts per million parts of organic material being stabilized.

The iron salts may be incorporated with the high molecular weight halogen-containing organic materials by any suitable method which will bring about a substantially uniform dispersion of the salt throughout the said organic materials. The salts may be added in a dissolved, suspended or pulverulent state to the desired organic materials which in turn may be in a dissolved, dispersed or solid state. If the material to be stabilized is a polymeric material the salts may be introduced as solutions, dispersions or solids in one or more of the reactants prior to the polymerization reaction, or they may be introduced subsequent to the polymerization reaction by any of the conventional methods for the incorporation of additives into the plastic compositions, such as by mixing the resin and stabilizers in a masticator or on heated differential rolls, or by powdering the resin and adding it to a solution containing the desired stabilizing agent.

Modifying agents, such as other stabilizers, plasticizers, pigments, fillers, and the like, may also be added to the organic material before, at the same time, or after the addition of the iron compounds. Other stabilizers that may be added include those which stabilize the material against embrittlement, etc. Plasticizers that may be added may be exemplified by dioctyl phthalate, dibutyl phthalate, dihexyl phthalate, tricresyl phosphate and methoxyethyl acetyl ricinoleate.

The stabilized compositions produced by the process of the invention may be subjected to any of the conventional fabrication processes employing heat and light without danger of decomposition. The stabilized halogen-containing polymers may, for example, be subjected to the usual milling, molding and shaping operations without undergoing any substantial discoloration or loss of physical properties. The stabilized polymers of the invention are particularly suited for use in the manufacture of articles that must be transparent or light in color and must be able to withstand prolonged periods of exposure to light and heat. The polymers may also be utilized for the preparation of various surface coating compositions, fibers, films, adhesives, and the like.

To illustrate the effectiveness of the iron salts in stabilizing the high molecular weight halogen-containing organic materials the following examples are cited. It should be understood, however, that the examples are for the purpose of illustration and the invention is not to be regarded as limited to any of the specific conditions cited therein.

Example I

Samples of polyvinyl chloride were slurried with water containing the additives shown in the table below. The samples were dried in an air oven at 60° C. with occasional stirring. 25 parts of each sample were mixed with 12.5 parts of dioctyl phthalate and the resulting mixtures milled on steel rolls at 140° C. for about 5 minutes. The milled sheets were then placed in molds and heated at 160° C. for three minutes to yield uniform smooth-surface sheets about 2 mm. thick. These sheets were given an accelerated aging test by heating in an air oven at 160° C. The amount of color developed in the sheets was determined photometrically using light of 500 mu wave length. All sheets were aged together to minimize differences which may otherwise occur. The results are shown in the following table:

| Additive | Amount of Additive, parts per million parts of polymer | Extinction Coefficient after 60 minutes of heating |
| --- | --- | --- |
| None | None | 6.7 |
| Iron (as ferric chloride) | .5 | 6.7 |
| Do | 1 | 5.1 |
| Do | 10 | 2.3 |
| Do | 95 | 6.5 |
| Do | 100 | 7.6 |
| Glycerol monooleate | 20,000 | 1.8 |

Thus, while the addition of as little as 100 parts iron (as ferric chloride) per million parts of polyvinyl chloride produced the expected increase in the discoloration of the polymer the addition of small proportions, i. e. from 1 part to 95 parts of iron per million parts of polymer, produce the directly opposite results, i. e. a stabilization of the polymer against discoloration.

The above results further indicate that the addition of the above-described minor quantities of iron salts had almost as great a stabilization effect as the addition of larger amounts, i. e. 20,000 parts per million, of the commercial stabilizer glycerol monooleate.

Example II

Various other salts were added to polyvinyl chloride samples by the same process as described in Example I above. The results are indicated in the table below:

| Metal | Added Salt | Amount of metal, parts per million parts of polymer | Extinction Coefficient after 60 minutes of heating |
| --- | --- | --- | --- |
| None | None | None | 5.3 |
| Iron | $FeCl_2.4H_2O$ | 10 | 2.1 |
| Do | $FeCl_3.6H_2O$ | 10 | 2.1 |
| Aluminum | $AlCl_3$ | .0 | 7.0 |
| Antimony | $SbCl_3$ | 10 | 5.9 |
| Bismuth | $BiCl_3$ | 10 | 6.3 |
| Cadmium | $CdCl_2$ | 10 | 6.7 |
| Lead | $PbCl_2$ | 10 | 6.4 |
| Magnesium | $MgCl_2.6H_2O$ | 10 | 6.1 |
| Manganese | $MnCl_2.4H_2O$ | 10 | 6.0 |
| Tin | $SnCl_2.2H_2O$ | 10 | 7.0 |
| Titanium | $TiCl_3$ | 10 | 6.0 |
| Tungsten | $HWO_4.NH_4OH$ | 10 | 7.2 |

As is apparent, the addition of other metals in the minor quantities had no stabilizing effect at all on the polyvinyl chloride, and in some cases even showed an accelerating effect on the formation of color in the said polymer. The results further indicate that the ferrous and ferric salts are equally efficacious in suppressing the appearance of color in the halogen-containing polymers.

Example III

Example I was repeated using another set of metal salts. The results are indicated in the table below:

| Added Metal | Amount of metal (parts per million of polymer) | Salts Used | Extinction Coefficient after 60 minutes |
| --- | --- | --- | --- |
| None | None | | 5.3 |
| Iron | 10 | $FeSO_4.7H_2O$ | 2.4 |
| Cobalt | 10 | $CoCl_2.6H_2O$ | 5.3 |
| Nickel | 10 | $NiCl_2.6H_2O$ | 5.3 |

The same stabilizing effect was obtained in this case using iron sulfate as was obtained in the previous examples using the iron chloride. This indicates that the important factor in the stabilization is the iron and the action is not dependent on the anionic complex with which the iron is combined. In addition, these results indicate that the closely related cobalt and nickel salts were ineffective as color stabilizers.

Example IV

Molded sheets of polyvinyl chloride containing various added metals as salts in concentration of 10 parts of metal per million of polymer were prepared as in Example I. In addition to the other ingredients 2 parts of basic lead silicate per 100 parts of polymer were also incorporated in the compound. Electrical resistivities of the sheets were determined at 25° C. using 500 volts potential. The results are indicated below:

| Added Metal | Salt Employed | Electrical Resistivity, ohm-cm. $\times 10^{14}$ |
| --- | --- | --- |
| None | | 2.4 |
| Iron | $FeCl_2.4H_2O$ | 3.1 |
| Do | $FeCl_3.6H_2O$ | 2.3 |
| Aluminum | $AlCl_3.6H_2O$ | 1.9 |
| Lead | $PbCl_2$ | 2.8 |

Thus the presence of the iron had no harmful effect on the electrical resistivity of the stabilized polymer. The addition of the ferrous iron was even slightly beneficial.

Example V

A copolymer of 50 per cent vinylidene chloride and 50 per cent vinyl chloride is slurried with water containing 60 parts of iron as ferrous chloride per million parts of added polymer. The mixture is dried in an air oven at 60° C. with occasional stirring. 50 parts of the dried mixture are mixed with 25 parts of dioctyl phthalate and the resulting mixture is milled on steel rolls at 140° C. for about 5 minutes. The milled sheets are then placed in molds and heated at 160° C. to yield uniform smooth-surface sheets. When subjected to the accelerated aging test shown in Example I the sheets show excellent stability toward discoloration.

Example VI

A copolymer of 95 per cent vinyl chloride and 5 per cent vinyl acetate is slurried with water containing 30 parts of iron as ferric sulfate per million parts of added polymer. The mixture is dried and the resulting product (50 parts) mixed with 20 parts of dioctyl phthalate and milled at 140° C. Molded sheets from this resin show excellent resistance toward discoloration when subjected to the above-described accelerated aging test.

*Example VII*

A commercially available chlorinated rubber having a viscosity of 20 centipoises at 25° C. as a 20% solution in toluene is stabilized with 25 parts of iron as ferric acetate per million parts of rubber, and subsequently plasticized with dibutyl phthalate (100 parts of rubber, 15 parts of plasticizer). When heated at 160° C. the resulting composition shows an increased resistance to discoloration.

*Example VIII*

A chlorinated paraffin wax having a melting point of about 90–100° C. and a chlorine content of about 70% is stabilized with 50 parts of iron as ferric tartarate per million parts of wax. When heated at 180° C. the resulting mixture shows an improved resistance to discoloration.

*Example IX*

Polyvinyl bromide is stabilized by the addition thereto of 30 parts of iron as ferrous chloride per million parts of polymer. The resulting composition displays excellent resistance toward discoloration when subjected to heat and light.

I claim as my invention:

1. A process for producing a colorless, color-stable, thermoplastic resin from polyvinyl chloride which comprises mixing the said polyvinyl chloride with a plasticizer and ferric chloride in an amount sufficient to furnish 10 parts of iron per million parts of polymer and subjecting a composition containing this mixture to a milling and molding operation, the heat employed in the said milling and molding operation being insufficient to convert the composition into a non-thermoplastic product.

2. A process for producing a colorless, color-stable, thermoplastic resin from a copolymer of vinyl chloride and vinyl acetate which comprises mixing the said copolymer with a plasticizer and ferric sulfate in an amount sufficient to furnish from 3 parts to 60 parts of iron per million parts of copolymer and subjecting a composition containing this mixture to a milling and molding operation, the heat employed in the said milling and molding operation being insufficient to convert the composition into a non-thermoplastic product.

3. A process for producing a color-stable thermoplastic resin from a copolymer of vinylidene chloride and vinyl chloride which comprises mixing the said copolymer with a plasticizer and ferrous chloride in an amount sufficient to furnish 3 parts to 60 parts of iron per million parts of copolymer and subjecting a compostion containing this mixture to a milling and molding operation, the heat employed in the said milling and molding operation being insufficient to convert the composition into a non-thermoplastic product.

4. A process for producing a colorless, color-stable, thermoplastic resin from a polyvinyl halide which comprises mixing the said polymer with a plasticizer and an iron salt in an amount sufficient to furnish from 3 parts to 60 parts of iron per million parts of polymer and subjecting a composition containing this mixture to a milling and molding operation, the heat employed in the said milling and molding operation being insufficient to convert the composition into a non-thermoplastic product.

5. A process for producing a color-stable, thermoplastic resin from a thermoplastic polymer of a vinyl halide which comprises mixing the said polymer with an iron salt of the group consisting of ferric chloride, ferrous chloride, ferric sulfate, ferrous sulfate, ferric acetate, ferrous acetate, ferric tartarate, ferrous tartarate, and ferrous oxalate, in an amount sufficient to furnish from 1 part to 95 parts of iron per million parts of polymer and subjecting a composition containing this mixture to a milling and molding operation, the heat employed in the milling and molding operation being insufficient to convert the composition into a non-thermoplastic product.

6. A process for producing a color-stable, thermoplastic resin from a thermoplastic halogen-containing polymer which comprises mixing the said polymer with an iron salt in an amount sufficient to furnish from 1 part to 95 parts of iron per million parts of polymer and subjecting a composition containing this mixture to a milling and molding operation, the heat employed in this milling and molding operation being insufficient to convert the composition into a non-thermoplastic product.

7. In a process for producing a color-stable, thermoplastic resin from a thermoplastic halogen-containing polymer, the steps which comprise mixing the said polymer with an iron salt in an amount sufficient to furnish from 1 part to 95 parts of iron per million parts of polymer before subjecting the said polymer to the milling and molding operation, and during the said milling and molding operation maintaining the heat below that required to convert the polymer into a non-thermoplastic product.

8. A process for stabilizing high molecular weight halogen containing material of the group consisting of halogenated fats, halogenated train oils and halogenated waxes, which comprises incorporating therewith an iron salt in an amount sufficient to furnish from 1 part to 95 parts of iron per million parts of material.

9. A colorless, color-stable, thermoplastic resin prepared by mixing polyvinyl chloride with a plasticizer and ferric chloride in an amount sufficient to furnish 10 parts of iron per million parts of polymer and subjecting a composition containing this mixture to a milling and molding operation, the heat employed in this milling and molding operation being insufficient to convert the composition into a non-thermoplastic product.

10. A colorless, color-stable thermoplastic resin prepared by mixing a copolymer of vinyl chloride and vinyl acetate with a plasticizer and ferric sulfate in an amount sufficient to furnish from 3 parts to 60 parts of iron per million parts of copolymer and subjecting a composition containing this mixture to a milling and molding operation, the heat employed in the said milling and molding operation being insufficient to convert the composition into a non-thermoplastic product.

11. A colorless, color-stable, thermoplastic resin prepared by mixing a copolymer of vinyl chloride and vinylidene chloride with a plasticizer and ferrous chloride in an amount sufficient to furnish 3 parts to 60 parts of iron per million parts of copolymer and subjecting a composition containing this mixture to a milling and molding operation, the heat employed in the said milling and molding operation being insufficient to convert the composition into a non-thermoplastic product.

12. A color-stable, thermoplastic resin prepared by mixing a polyvinyl chloride with a plasticizer and an iron salt in an amount sufficient to furnish from 3 parts to 60 parts of iron per million parts of polymer and subjecting a composition containing this mixture to a milling and molding operation, the heat employed in the said milling and molding operation being insufficient to convert the composition into a non-thermoplastic product.

13. A color-stable, thermoplastic resin prepared by mixing a thermoplastic polymer of a vinyl halide with an iron salt of the group consisting of ferric chloride, ferrous chloride, ferric sulfate, ferrous sulfate, ferric acetate, ferrous acetate, ferric tartarate, ferrous tartarate, and ferrous oxalate, in an amount sufficient to furnish from 1 part to 95 parts of iron per million parts of polymer and subjecting a composition containing this mixture to a milling and molding operation, the heat employed in the milling and molding operation being insufficient to convert the composition into a non-thermoplastic product.

14. A color-stable, thermoplastic resin prepared by mixing a thermoplastic halogen-containing polymer with an iron salt in an amount sufficient to furnish from 1 part to 95 parts of iron per million parts of polymer and subjecting a composition containing this mixture to a milling and molding operation, the heat employed in this milling and molding operation being insufficient to convert the composition into a non-thermoplastic product.

15. A composition comprising a high molecular weight halogen-containing material of the group consisting of halogenated fats, halogenated train oils and halogenated waxes, and an iron salt in an amount sufficient to furnish from 1 part to 95 parts of iron per million parts of material.

16. In a process for producing a color-stable, thermoplastic resin from a thermoplastic vinyl halide polymer wherein the polymer is subjected to a milling and molding operation, the steps which comprise mixing the said polymer with an iron salt in an amount sufficient to furnish from 3 parts to 60 parts of iron per million parts of polymer before subjecting the said polymer to the milling and molding operation, and during the said milling and molding operation maintaining the heat below that required to convert the polymer into a non-thermoplastic product.

17. A colorless, color-stable, thermoplastic resin prepared by mixing a thermoplastic vinyl halide polymer with an iron salt in an amount sufficient to furnish from 3 parts to 60 parts of iron per million parts of polymer and subjecting a composition containing this mixture to a milling and molding operation, the heat employed in this milling and molding operation being insufficient to convert the composition into a non-thermoplastic product.

HARRY A. CHENEY.

REFERENCES CITED

The following references are of record in the file of this patent:

UNITED STATES PATENTS

| Number | Name | Date |
|---|---|---|
| 2,157,997 | Brous | May 9, 1949 |